J. W. STREET.

CATTLE CAR.

No. 4,340. Reissued Apr. 11, 1871.

*Witnesses:*

J. Dennis Jr.

Fred. Artois

*Inventor:*

John W. Street

N. PETERS, Photo-Lithographer, Washington, D. C.

United States Patent Office.

JOHN W. STREET, OF MARSHALLTOWN, IOWA.

Letters Patent No. 96,362, dated November 2, 1869; reissue No. 4,340, dated April 11, 1871.

IMPROVEMENT IN CATTLE-CARS.

The Schedule referred to in these Letters Patent and making part of the same.

I, JOHN W. STREET, of Marshalltown, Marshall county, in the State of Iowa, have invented certain Improvements in Railway Cars for the Transportation of Horses, Cattle, and other Live Stock, of which the following is a specification.

The first part of my invention relates to the division of the car into stalls or apartments by partitions or gates extending across or nearly across the car, the same being so constructed, arranged, and secured as to produce several important advantages, as will be fully set forth below.

The second part of my invention relates to certain devices and arrangements for supplying water and feed to the stock while in the car, as will be hereinafter fully explained.

In the drawing accompanying and forming part of this specification—

Figure 1:
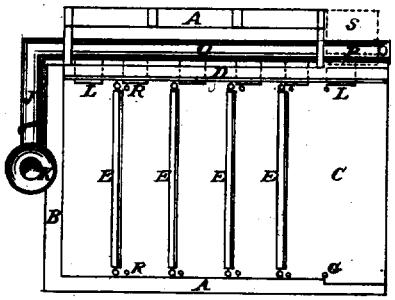
Figure 1 is a plan of one-half of a long or eight-wheel car with my improvements, the top being removed to show the interior.
Figure 2:
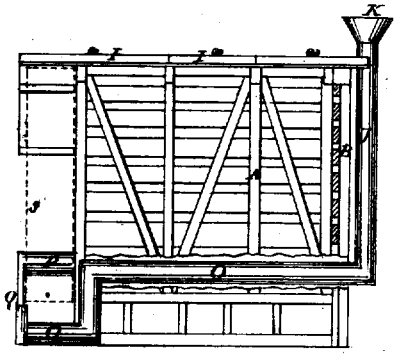
Figure 2 is a side elevation of the same.

A A are the sides of the car;

B, the end; and

C, the floor.

D is a vertical frame or series of posts dividing off a space along one side of the car, within which the fixtures for holding feed and water are placed.

The partitions or gates E E are provided at both ends with detachable hinges, which may be formed by the rods F passing through the staples or eyes G, fastened to the gates and in the frame or posts D, and to the side of the car, as shown.

The posts D are placed far enough from the side A, to which they are adjacent, to allow the wide-spreading horns of cattle standing in the stalls to pass by them to the right and left, between the posts and the side of the car, so as to permit a free movement of the head, and to allow the ready entrance or exit of the cattle when the partitions are swung back.

The gates E are made rigid, or without any flexible joint in them for folding, and as they extend from the posts G to the opposite side of the car, the animals will be unable to pass from one stall to another without swinging the gate around further than will be practicable when the stalls are occupied, and hence the animals will be kept apart whether the rear ends of the gates be fastened or not.

H is an upper floor, placed some distance below the roof, but high enough to be out of the way of the animals' heads, to form a bin or store-room for feed. It may be filled through doors or hatches I I in the roof, and the feed may be supplied to the animals as required, by dropping it down between the frame D and the side of the car into feed-boxes, racks, or mangers at the ends of the stalls, openings or trap-doors being provided for that purpose in the floor of the feed-room.

I contemplate the use of a pipe, having a funnel top, to receive grain or other short feed, and convey it down from the feed-room into the boxes or mangers in the stalls.

J is a water-pipe, having a funnel top, K, to receive water from the same hose or pipe that the engine-tank is filled from, and arranged at the top of the car on or near the middle line of the train, so as to be filled with equal facility from either side.

Near the bottom of the car the pipe J connects with a horizontal pipe or reservoir, O, extending through the car lengthwise between the posts or frame D and the side A, and having connected with it troughs or basins L, one in each stall, with openings into them from the pipe O, to supply water to the animals in the stalls.

The reservoir O should be provided with a waste-way, so that when filled to a level somewhat below the upper edges of the troughs L any further supply will escape without causing the troughs to overflow into the stalls or upon the floor of the car.

The pipes J, on each pair of adjacent cars, are to be placed on the adjacent ends of the two cars, so that both may be filled or supplied from the station-tank without moving the train.

At the door of the car the pipe O is bent twice at right angles, to pass under the doorway, whence it rises again in the same manner after passing the doorway, so as to be continuous from end to end of the car without obstructing the doorway.

A short supplementary detachable reservoir, P, connecting with O by the pipe Q, is arranged across the doorway, to supply water to the stalls opposite the door, and so as to be capable of being removed whenever the doorway is required to be open for use.

At S is shown, in dotted lines, a portion of a door provided with an inner frame, nearly corresponding to the frame D, within which the small reservoir P is to be placed, the connecting-pipe Q passing down through the bottom into the pipe O.

That portion of the pipe or reservoir O that is under the doorway may be inclosed in a box or case, in which, in the winter season, a stove may be placed, to prevent freezing, the water heated in this lower part naturally rising into the higher portions.

Figure 3:
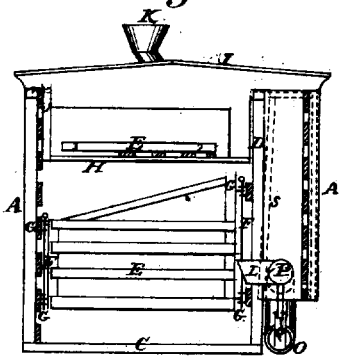
Figure 3 is an end view.

As the gates E are supported by loose or detachable hinges at both ends, which may be used either as hinges or fastenings, as required, either end may be swung around, according to the side at which it may be desirable to load or unload; and when it is required to have the car-body clear for other kinds of freight both ends of the gates may be detached, and they may then be stowed away in the feed-room in the top of the car, as shown in fig. 3.

R R are additional eyes or staples for holding the gates or partitions, by means of which the width of certain stalls may be increased or diminished to adapt them to animals of different sizes.

It has been proved by actual experiment that, by the use of cars constructed as above described, live stock may be transported thousands of miles without detention for feeding, watering, or rest, without the usual loss of weight and condition, and without injury or suffering of any kind, and with a great saving of both time and expense.

The foregoing being a full description of my invention and improvements in stock or cattle-cars,

What I claim, and desire to secure by Letters Patent, is—

1. A stall partition, constructed in a single rack or gate attached near the head of the stall, so as to swing horizontally, and fastened at the rear end to the side of the car by a detachable fastening in the manner and for the purpose set forth.

2. The swinging partitions, in combination with the open spaceway at the head of the stalls, as and for the purpose set forth.

3. A railway car for live stock, when divided into stalls by swinging gates or partitions, provided with detachable hinges at both ends, so that either end may be swung around to admit or release the animals, and so that both ends of the gate may be detached, to clear the car for other kinds of freight, substantially as descibed.

4. A store-room or feed-bin in the top of the car, provided with doors or hatches in the roof for filling the same, and with openings through the floor at one side for dropping the feed into mangers or feed-boxes in the ends of the stalls below, substantially as herein described.

5. The arrangement of the reservoir O in the side of the car, at a suitable height to supply water to the drinking-troughs or basins, without the use of a pipe and stop-cock, substantially as described.

6. The arrangement of the troughs L with reference to the pipe O, whereby the water may be allowed to flow freely through the openings in the side of the pipe into the troughs and stand at the same level in both, substantially as described.

7. The arrangement of the pipe or reservoir O, whereby it is made to convey water from end to end of the car without obstructing the doorway, by passing under the same, substantially as described.

JOHN W. STREET.

Witnesses:
J. DENNIS, JR.,
JNO. D. PATTEN.